United States Patent [19]
Rupert et al.

[11] 3,846,903
[45] Nov. 12, 1974

[54] VACUUM BRAZING TANTALUM ALLOYS

[75] Inventors: Edward J. Rupert, Wheatridge; Monroe W. Meyer, Littleton; Gerald E. Uhland, Aurora, all of Colo.

[73] Assignee: The United States of America as represented by the Secretary of the Air Force, Washington, D.C.

[22] Filed: July 13, 1973

[21] Appl. No.: 379,024

[52] U.S. Cl. ................ 29/487, 29/470.9, 29/493, 29/494
[51] Int. Cl. ............................................ B23k 1/04
[58] Field of Search .... 29/473.1, 487, 470.9, 471.1, 29/472.3, 493, 494, 504

[56] References Cited
UNITED STATES PATENTS

| | | | |
|---|---|---|---|
| 2,979,808 | 4/1961 | Booth | 29/493 |
| 3,069,766 | 12/1962 | Rush | 29/493 |
| 3,073,268 | 1/1963 | Cole | 29/493 X |
| 3,110,961 | 11/1963 | Melill et al. | 29/471.1 |
| 3,168,782 | 2/1965 | Cochran | 29/493 X |
| 3,259,971 | 7/1966 | Gagola et al. | 29/487 |
| 3,284,607 | 11/1966 | Wernz et al. | 29/471.1 |

Primary Examiner—Roy Lake
Assistant Examiner—Paul A. Bell
Attorney, Agent, or Firm—Harry A. Herbert, Jr.; Cedric H. Kuhn

[57] ABSTRACT

A process is provided for fabricating a structure by vacuum brazing tantalum alloy elements in which a columbium-vanadium brazing foil is placed between surfaces of the elements to be joined; a coating of yttria powder is applied to surfaces of elements that will be in contact with a tungsten hearth plate and tungsten pellets; the structure is positioned on the tungsten hearth plate in a vacuum heating zone with tungsten pellets disposed on top of the portion of the upper element to be joined so as to exert pressure thereon and control the gap between the surfaces to be joined; the elements are heated under a vacuum in the vacuum heating zone to a temperature sufficient to melt the brazing foil; and after soaking at that temperature for several minutes the elements are gradually cooled to room temperature. The vacuum brazing process is particularly suitable for use in fabricating honeycomb sandwich panels, utilizing tantalum alloy structural elements.

8 Claims, 3 Drawing Figures

3,846,903

VACUUM BRAZING TANTALUM ALLOYS

FIELD OF THE INVENTION

This invention relates to a process for vacuum brazing structural elements formed of tantalum alloys. In one aspect it relates to a process for fabricating honeycomb structures by vacuum brazing of tantalum alloys. In another aspect it relates to an assembly of elements for use in the fabrication of honeycomb panels.

BACKGROUND OF THE INVENTION

Because of their high strength to weight ratio, structural honeycomb panels are ideally suited for use as components in the manufacture of hypersonic aerospace vehicles. In certain applications, e.g., when used as heat shield panels, the structures must be capable of withstanding very high temperatures. Tantalum alloys possess the requisite high melting point and high strength properties that would render them particularly suitable for use in fabricating the honeycomb panels.

Honeycomb structures can be conveniently formed by brazing. This is a process in which a filler metal, which melts lower than either of the two parent metals being joined, is flowed by raising the temperature to the filler metal melting point. In the brazing operation, only the filler metal melts. However, the melted filler metal does dissolve part of the parent metal, forming an alloy of the filler and parent metals. As refractory metals are highly reactive with oxygen, the brazing of these metals is conventionally carried out in a high vacuum furnace. The conventional vacuum brazing processes have not, however, proven to be capable of producing an acceptable honeycomb panel from tantalum alloys. This failure has been attributed to several factors, including lack of a suitable brazing or filler metal, unsatisfactory stop-off material, and poor control of gap between elements being brazed. As a result, honeycomb panels fabricated from tantalum alloys by such procedures, e.g., using zirconia stop-off and hafnium braze powder, are unsatisfactory because of base metal embrittlement caused by oxygen transfer from decomposed zirconia and embrittled brazement caused by the braze powder. Also, the elements are poorly bonded when utilizing the prior art vacuum brazing processes.

It is an object of this invention, therefore, to provide an improved process for vacuum brazing tantalum alloys.

Another object of the invention is to provide a vacuum brazing process for fabricating honeycomb panels from tantalum alloys.

A further object is to provide an assembly of elements for use in fabricating a honeycomb panel by vacuum brazing.

Other objects and advantages of the invention will become apparent to those skilled in the art upon consideration of the accompanying disclosure and the drawing in which.

SUMMARY OF THE INVENTION

The present invention resides in a process for vacuum brazing tantalum alloy structural elements which comprises positioning foil of a columbium-vanadium alloy between surfaces of the elements to be joined; coating surfaces of the elements that are to be in contact with a tungsten hearth plate and tungsten pellets with yttria powder; positioning the elements on a tungsten hearth plate disposed in a vacuum heating zone so that the yttria coated lowermost surface of the elements rests on the hearth plate; placing tungsten pellets on the yttria coated uppermost surface of the elements, thereby applying a pressure thereto so as to control the gap between the surfaces to be joined; heating the elements under a vacuum to a temperature sufficient to melt the foil; and after soaking at that temperature for several minutes allowing the elements to cool gradually to room temperature.

Figure 1:
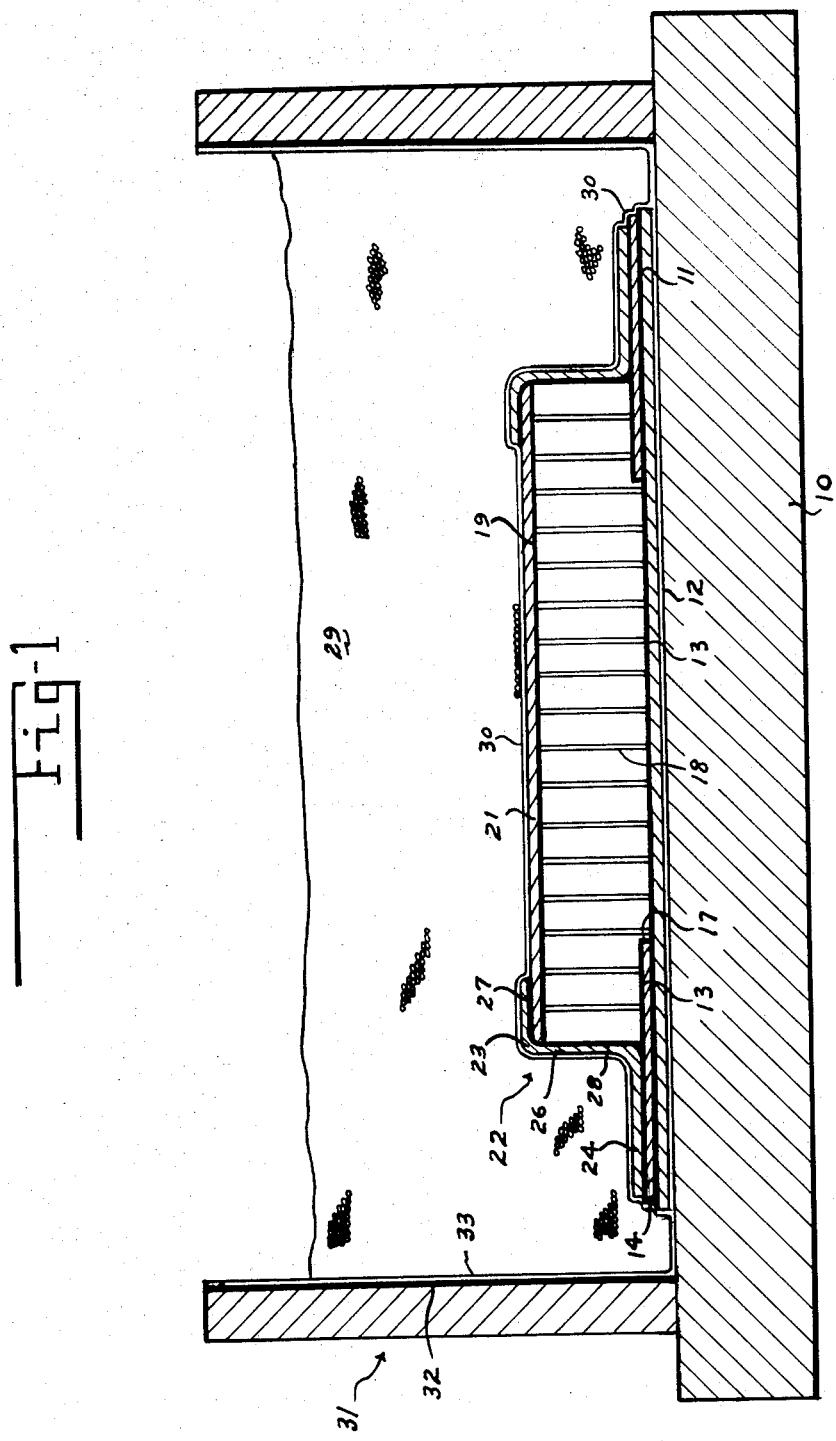
FIG. 1 is an elevational view, in section, of a lay up of a honeycomb panel prior to vacuum brazing.
Figure 2:
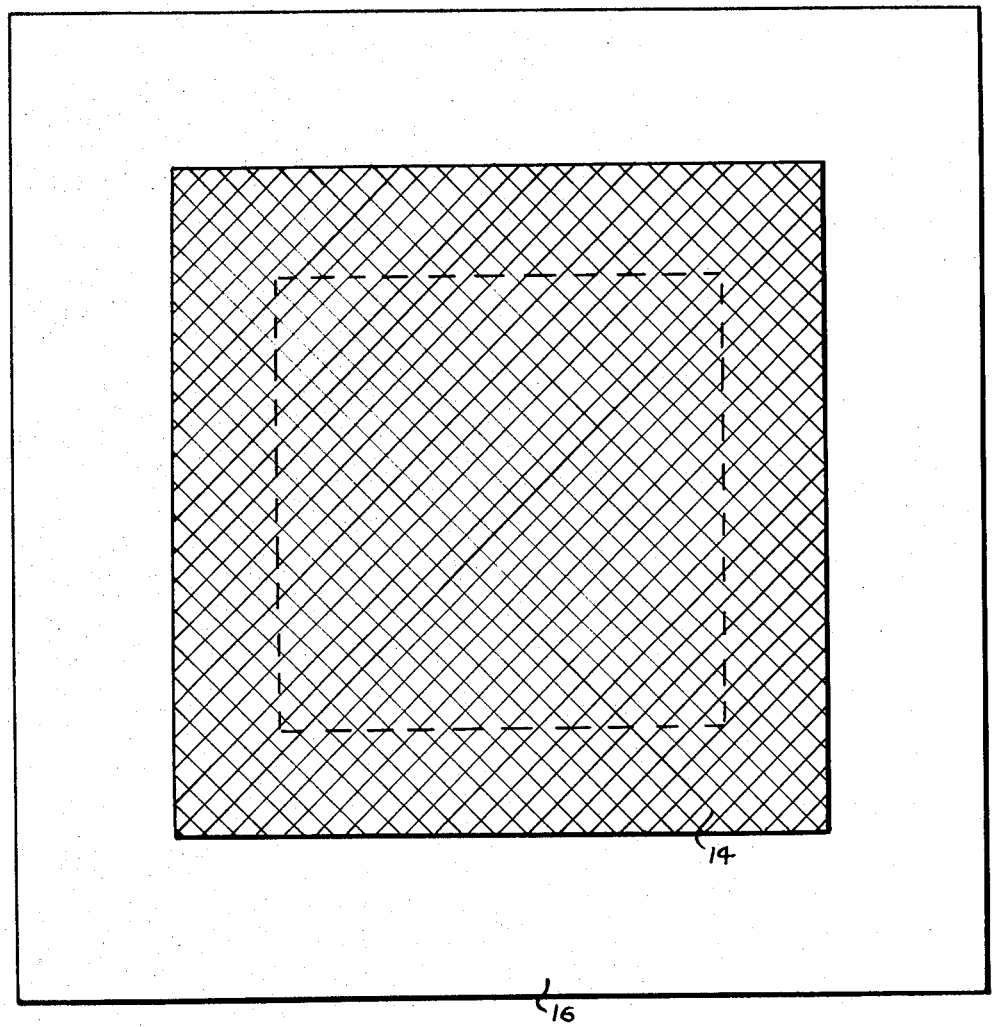
FIG. 2 is a plan view of the honeycomb core positioned on the doubler.

For a better comprehension of the invention, reference is now made to FIGS. 1 and 2 of the drawing. In FIG. 1 there is illustrated a lay up for fabricating a honeycomb panel. As depicted, the entire assembly is disposed on a tungsten hearth plate 10 which is positioned during brazing in the chamber of a vacuum furnace (not shown). Outer skin or lower plate 11, formed of a tantalum alloy, is placed on the top surface of the hearth plate. To prevent diffusion bonding of the tantalum and tungsten, a coating of yttria powder 12, termed a stop-off, is applied to the surface of the outer skin that rests on the hearth plate.

For a material to function satisfactorily as a stop-off, it must be stable at the temperatures to be encountered in the brazing operation. It was found that yttria met this requirement whereas other oxides normally used for stop-off disassociated at brazing temperatures. As a result of the disassociation, the tungsten and tantalum were contaminated by oxygen. The yttria powder is applied to the surface of the outer skin as a suspension in glycerine. The suspension is advantageously in the form of a thin paste which can be applied with a brush or by other suitable means. Glycerine was found to be particularly suitable as a carrier for the yttria. Thus, glycerine provides good adhesion for the yttria powder so that it remains in place during the brazing cycle. Furthermore, glycerine upon heating does not decompose, giving off oxygen and leaving a carbon residue which would adversely affect the brazing materials. This adverse affect takes the form of embrittlement of tantalum. Other materials, such as water, methanol, butyl acetate and a lacquer base material, were found to be unsatisfactory for use as a carrier or binder for the yttria powder. After application of the yttria suspension, it is allowed to dry. In a preferred procedure, the coating is baked under a vacuum until dry so that the bulk of the off-gassing is removed from the suspension before the brazing operation.

A brazing material 13 in the form of a foil of a columbium-vanadium alloy is disposed on and covers the top surface of outer skin 11. The preferred alloy contains about 35 weight percent columbium and about 65 weight percent vanadium and is conveniently referred to as Cb-65V alloy. Doubler or frame member 14, formed of the tantalum alloy, rests on braze foil 13 and has its upper surface 16 and interior vertical edge 17 covered with Cb-65V brazing foil. The lower surface or face of honeycomb core 18 is positioned on braze foil 13. The outer edge of the lower surface of the honeycomb is cut away or notched to provide a recess into which a portion of the doubler extends. A clearer understanding of the arrangement of the honeycomb core and doubler can be obtained by referring to FIG. 2. As seen from this figure, the distance between the broken line and the outer edge of the honeycomb corresponds to the width of the recess. The depth of the recess is equal to the thickness of the doubler plus the thickness of braze foil 13.

Covering the upper surface or face of honeycomb 18 is foil 19 of the Cb-65V braze alloy. Inner skin or upper plate 21 is positioned on foil 19. A Zee frame member, formed of the tantalum alloy and consisting of horizontal legs 23 and 24 and vertical leg 26, encompasses the perimeter of the honeycomb core. Thus, horizontal leg 24 rests on braze foil 13 positioned on doubler 14 while horizontal leg 23 rests on braze foil 27 disposed between that leg and inner skin 21. Vertical leg 26 connecting the two horizontal legs is separated from the sides of the honeycomb by braze foil 28. From this description it is seen that Cb-65V braze foil is positioned between the inner surface of the Zee frame and the elements of the assembly with which it would otherwise come into contact.

As mentioned above, the lower surface of outer skin 11 is coated with a yttria stop-off 12. In the manner previously described, the outer or exposed surfaces of the inner skin and Zee frame as well as the ends of the Zee frame, doubler and outer skin are coated with the yttria stop-off 30. The function of these coatings is to prevent contact between the tantalum alloy from which the indicated elements are fabricated and tungsten pellets 29.

From the foregoing description of the lay up of the honeycomb assembly, it is seen that there is a braze alloy interface between the honeycomb core and the other elements of the assembly. The bazing alloy interface is from 0.003 to 0.005, preferably 0.004, inch thick foil at the lay up stages, i.e., prior to melting. It has been found that 0.002 inch thick material does not provide an adequate reservoir upon melting for filling the vertical nodes of the honeycomb core.

The space or gap between surfaces to be brazed must be closely controlled. Gap control is important because brazing alloys in their liquid state will bridge only a certain sized gap. The brazing alloy used in the process of this invention will bridge a gap of about 0.002 inch thickness. Accordingly, it is necessary to machine the honeycomb thickness to within about 0.001 of the calculated or desired thickness so as to be assured of braze alloy coverage at all faying surfaces. If the thickness of outer skin 11, inner skin 21 and doubler 14 and the height of vertical leg 26 of the Zee frame are known, or can be readily determined by measurement, then the thickness of the honeycomb can be readily calculated. Assuming that a 0.004 inch thick braze foil is to be used, it is noted that the thickness of the alloy after melting, i.e., 0.002 inch, should be used in the calculations. Thus, in the fabrication of the pre-brazed lay up, gap control is conveniently obtained by machining the honeycomb so as to conform to the dimensions of the other components of the particular assembly.

The tungsten pellets are placed on the honeycomb lay up in an amount sufficient to provide a downward pressure of at least 0.75, e.g., 0.75 to 0.85, pound per square inch. The vertical pressure exerted by the pellets is necessary to ensure that the components remain in their relative positions to one another and also to control the gap during the brazing operation. It is observed that an 18 inch square panel "grows" about nine-sixteenth inch on being heated from room temperature to 3,500° F. The thermal expansion of the panel causes movement of the entire brazing assembly, thereby presenting a problem in gap control. This problem is obviated by using tungsten pellets which provide a fluidized type of weight. A constant vertical pressure is achieved because the pellets tend to settle and provide a consistent weight on top of the assembly even as it shifts position as a result of thermal expansion and stress relief. It has been found that a weight (pressure) less than 0.75 pound per square inch is insufficient to maintain gap control.

The tungsten pellets are maintained in place by means of a fence 31 which is positioned on tungsten hearth plate 10 and surrounds the honeycomb panel assembly. The fence is conveniently composed of tungsten blocks which are laid end to end around the perimeter of hearth plate 10. The inner side of the fence is lined with tantalum foil 32 which is coated with yttria stop-off in the manner previously described. As seen from FIG. 1, the yttria stop-off 33 on the liner is extended onto the hearth plate so as to meet the stop-off covering the honeycomb assembly.

The elements of the panel, i.e., the honeycomb core, the inner and outer skins, the doubler and the Zee frame, are each fabricated from a tantalum alloy. Examples of tantalum alloys include those identified in the trade as Ta-10W, T-111 and T-222. The composition of each of these alloys, in weight percentages, is set forth below.

| Alloying Element | Ta-10W | T-111 | T-222 |
| --- | --- | --- | --- |
| Tungsten | 10 | 7-9 | 9.6-11.2 |
| Hafnium | | 1.8 | 2.2-2.8 |
| Carbon | | .005 max. | .008-.0175 |
| Tantalum | Balance | Balance | Balance |

The preferred tantalum alloy is T-222 because of its high strength at high temperature and greater ductility as compared to other tantalum alloys.

In the actual brazing operation, the tungsten hearth plate with the elements disposed thereon as shown in FIG. 1 is positioned in a vacuum furnace. The vacuum maintained during the brazing cycle is important because air and other gases, which might deteriorate the tantalum alloy, must be excluded to the greatest extent possible. Accordingly, the furnace chamber is initially vacuum purged at room temperature for a period of at least 6 hours at a $10^{-5}$ torr vacuum. A vacuum purge time of 6 to 8 hours is usually preferred. At the end of this period, heating is commenced while still maintaining the furnace under a vacuum to exclude air and preserve the integrity of the alloy.

The temperature cycle itself must be carefully controlled so that uneven heating producing unequal expansions due to thermal rises are held to a minimum. In general, this control is accomplished by initially heating the assembly gradually to a temperature ranging from about 2,000° to 2,200° F. The period of time for increasing the temperature to the indicated range usually ranges from about 2.5 to 4.5, preferably from 3.5 to 4, hours. In a preferred procedure, thermal arrests are made at intermediate temperatures, e.g., at a temperature in the range of about 900° to 1,200° F for about 1 to 2 hours and at a temperature in the range of about 1,500° to 1,700° F for about 0.25 to 1.0 hour. Furthermore, there is a thermal arrest at a temperature in the range of 2,000° to 2,200° F for a period about 0.5 to 1.0 hour.

The gradual heating and thermal arrests below about 2,000° F are important in preventing or alleviating uneven heating in the brazing compact. In a vacuum, heat is transferred only by radiation. Thus, until radiation becomes the principal method of heat transfer, i.e., at temperatures above 2,000° F, the rate of heat transfer is very slow. Also, the tungsten pellets have a tendency to be fairly good insulators, trapping dead space among them and allowing for very long heat-up time from the top to bottom. During the early portion of the heating period, therefore, bowing or other distortion effects can occur if the thermal expansion rate at various locations within the brazing compact is uneven. The honeycomb panel is instrumented with thermocouples which make it possible to measure the temperature difference across the panel at any specific temperature. In general, the furnace temperature is controlled so that this temperature difference does not exceed 150° F. By operating in this manner, it has been found that distortion-free honeycomb panels can be produced.

After the thermal arrest at the temperature in the range of 2,000° to 2,200° F, the assembly is rapidly heated to a temperature below the melting point of the brazing alloy, i.e., below about 3,400° F. Thus, the assembly is usually heated to a temperature in the range of about 3,100° to 3,150° F in a period of about 10 to 20 minutes. After a temperature in the range of 2,000° to 2,200° F has been reached, the temperature differential across the panel is of lesser importance while elapsed time becomes of greater importance. This is due not only to the exacting time requirements for the actual melt cycle but also for the heat-up time between 2,200° F and about 3,100° F. During this temperature span, various materials, such as columbium and vanadium in the brazing alloy, develop solid state vapor pressures. As the temperature increases, the vapor pressure also increases. Thus, if too long a time is experienced in this temperature range, the brazing alloy actually vaporizes in the hard vacuum from the solid state without ever melting. The more vaporization that occurs the less brazing alloy there is to actually melt and flow during the brazing cycle. Additionally, the phenomenon of diffusion of the brazing alloy in the solid state into the parent metal also occurs, which also has the same effect as vaporization, i.e., lessening the amount of brazing alloy available at the time of melting.

After reaching a temperature in the range of about 3,100° to 3,150° F, there is a short period of thermal arrest, e.g., from about 10 to 20 minutes. Thereafter, the temperature is raised to at least the melting point of the brazing alloy, e.g., to a temperature ranging from 3,400° to 3,600° F in a period of from 6 to 12 minutes. The temperature is maintained at the melting point of the braze alloy for a length of time such that melting and flowing of the brazing alloy occurs. During this period a small amount of alloying takes place between the parent metal and the brazing alloy. To prevent this alloying from proceeding too far, the period of time at the brazing temperature must be carefully controlled and accurately terminated. Too short a period in the brazing cycle causes incomplete alloying while too long a period causes erosion. In either event the result is an unacceptable brazed product. The panel assembly is maintained at the melting point of the brazing alloy for a period of from 3 to 8, preferably from 4 to 5, minutes. Thereafter, the temperature is lowered rapidly to below that of the brazing alloy's melting point. For example, the vacuum furnace chamber is cooled to 2,900° F within 7 minutes after which it is cooled to 1,300° F in increments of 100° F every 5 minutes. The assembly is then allowed to furnace cool to 150° F.

At the beginning of the brazing operation, the vacuum maintained is about $10^{-5}$ torr. As heating of the assembly progresses, trapped gases from the pellet load and the rest of the brazing compact are released so that the pressure rises to about $5 \times 10^{-4}$ torr. After completion of this off gassing, the vacuum is maintained at $10^{-5}$ or better until the vaporization effect provides a partial pressure of metal alloy and causes an apparent loss of vacuum. Thus, the higher the temperature the more difficult it is to maintain low vacuum on the order of $10^{-5}$ torr. The actual pressure during the brazing (melting) cycle is generally lower because the brazing alloy as it melts has a higher vapor pressure than it does in the solid state. A rise in pressure to $10^{-4}$ torr is usually experienced at the point of melting, a condition that indicates when melting occurs. When the temperature of the brazing assembly is decreasing after melting has occurred, the best vacuum of the entire operation are ordinarily achieved. Thus, during the cooling cycle, vacuums on the order of $10^{-6}$ and even $10^{-7}$ torr are often obtained.

After the furnace chamber has cooled, the honeycomb panel is recovered therefrom after removal of the tungsten pellets. The surfaces of the panel are cleaned by wiping off the yttria powder. Since the tantalum alloy is subject to oxidation when heated at elevated temperatures, e.g., 800° F and above, a protective coating is applied thereto prior to its use in a high temperature environment. A particularly suitable protective coating is obtained by application of Sylvania's Sylcor type R-512C, a modified silicide slurry. After application of the slurry, the honeycomb panel is fired at 2,800° F to provide the protective coating. The coating so applied is effective in protecting the panel against oxidation at temperatures up to 3,200° F and higher.

A more complete understanding of the invention can be obtained by referring to the following illustrative example which is not intended, however, to be unduly limitative of the invention.

EXAMPLE

A run is conducted in which an 18 inch square honeycomb panel is fabricated. The brazing compact is assembled as shown in FIG. 1 and as described in conjunction therewith. All members of the brazing compact, including the inner skin, the outer skin, the doubler and the Zee frame are T-222 tantalum alloy. Yttria stop-off is applied in the manner described hereinabove. The honeycomb core is composed of T-222 tantalum foil which has been previously corrugated and spot welded at the nodes. The foil is cut from an 18 inches × 18 inches × 4 inches billet to a thickness of 0.006 inch. The core is then machined to a thickness determined by calculations based on known thicknesses of the inner and outer skins and the doubler and the height of the Zee frame vertical leg. The Cb-65V brazing foil has a thickness of 0.004 inch, and in the calculations, allowance is made for its thickness after it has melted. The following are the calculations made in determining the thickness to which the honeycomb is machined:

```
              inch
           0.0186   Outer skin
+0.0020  _____ Braze alloy (Outer skin-doubler)
           0.0206
+0.0563  _____ Doubler
           0.0769
+0.0020  _____ Braze alloy (Doubler-Zee frame)
           0.0789
+0.3960  _____ Zee frame leg height
           0.4749
-0.0020  _____ Braze alloy (Zee frame-inner skin)
           0.4729
-0.0120  _____ Inner skin
           0.4609
-0.0020  _____ Braze alloy (Inner skin-core)
           0.4589
-0.0020  _____ Braze alloy (Outer skin-core)
           0.4569
-0.0186  _____ Outer skin
           0.4386   Honeycomb thickness
```

Brazing foil is placed so that it will provide flow at all points of contact on all faying surfaces. Thus, the surfaces between the doubler and the core and the outer skin are entirely covered with brazing alloy foil. Similarly, the areas between the Zee frame and the doubler and the area between the inner skin and the core are entirely covered as well as the edge between the Zee frame and the inner skin. In addition, brazing alloy is placed on the vertical leg of the Zee frame so that the edge of the core will also be brazed to the Zee frame leg. Prior to placement the foil is cleaned. Appropriately sized strips are cut and spot welded to the structural members (not to the core) so as to maintain them in position.

Figure 3:
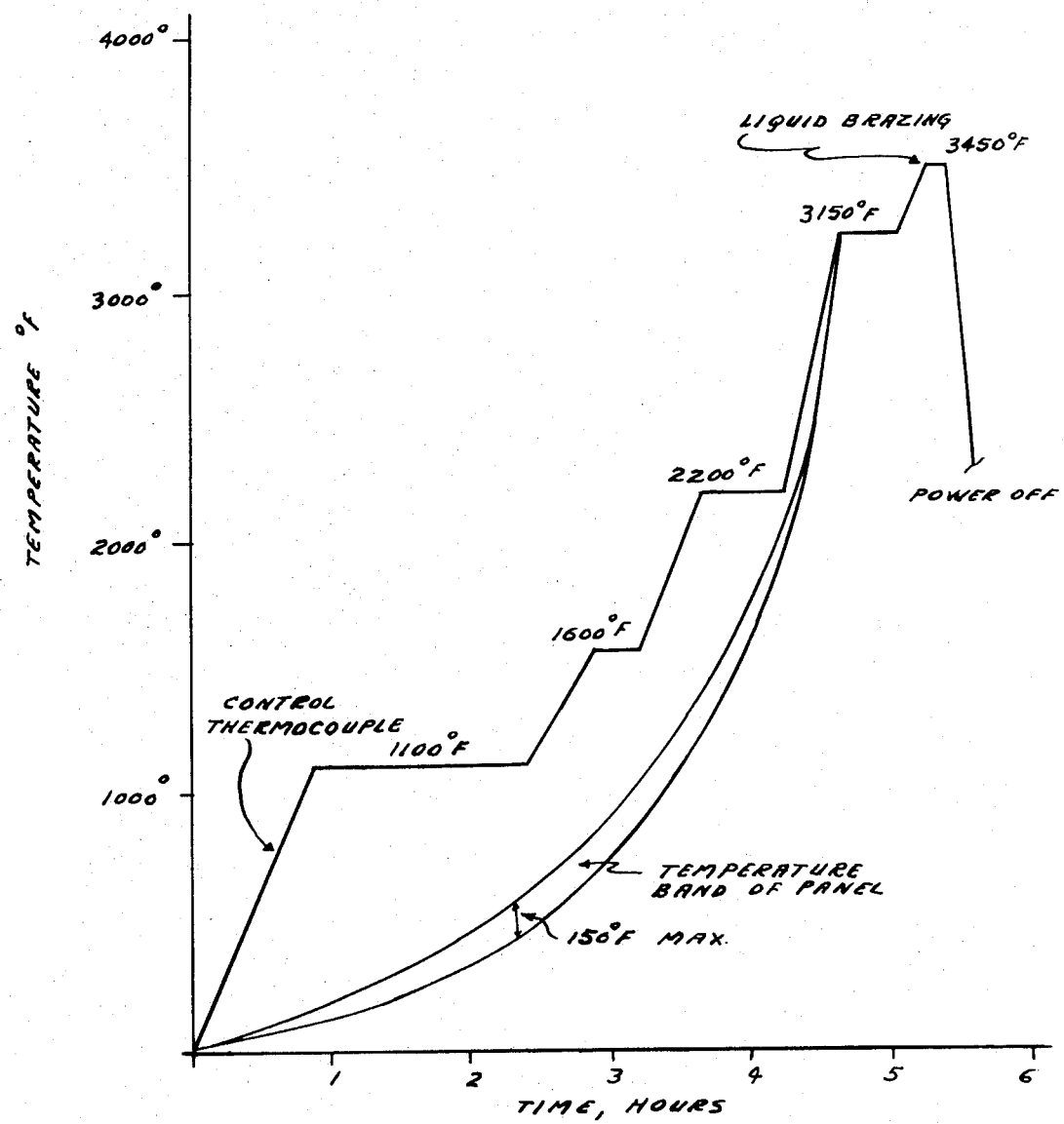
FIG. 3 is a graph showing a typical heat cycle in vacuum brazing a honeycomb panel.

The brazing compact disposed on the tungsten hearth plate is positioned in the chamber of a 4,000° F ABAR vacuum furnace. Tungsten pellets are disposed on the braze compact so as to provide a downward pressure of approximately 0.75 lbs/in$^2$. Initially the furnace chamber is vacuum purged at $10^{-5}$ torr for a period of 7 hours at ambient temperature so as to remove any entrapped air. Thereafter, heating of the furnace chamber is commenced while maintaining the chamber under a vacuum. The temperature cycle is carefully controlled so that uneven heating producing unequal expansions as a result of thermal rises is held to a minimum. In FIG. 3 there is shown the heat-up and cool-down curve for the brazing compact. The panel is instrumented with thermocouples that make it possible to measure the temperature band of the panel. As seen from the two curves in FIG. 3, the maximum temperature differential across the panel is 150° F. At the beginning of the heating cycle, the vacuum is maintained at about $10^{-5}$ torr. As the heating proceeds, the pressure rises to about 5 × $10^{-4}$ torr as a result of off gassing upon completion of which the vacuum of $10^{-5}$ torr is maintained until melting of the brazing alloy occurs. At this point the pressure rises to $10^{-4}$ torr. At the end of the brazing and when the brazing compact is decreasing in temperature, the vacuum is on the order of $10^{-6}$ torr.

After the honeycomb compact cools to 2,900° F, it is allowed to cool in increments of 100° F every 5 minutes down to 1,300° F. The furnace is then permitted to cool to 150° F after which the load is removed from the furnace chamber. After recovering the honeycomb panel, the yttria stop-off is wiped off. The panel is flat and does not leak. The ultrasonic pattern shows good filleting and bonding. While several factors, e.g., use of yttria stop-off and tungsten pellets, combine in making it possible to fabricate a superior honeycomb panel from a tantalum alloy, the particular braze system used is of particular significance. The advantages of the columbium-vanadium alloy brazing material include the following:

1. the material is in foil form and is ductile;
2. the material does not form a brittle melt with the tantalum alloy and does not embrittle the base metal;
3. the material has a broad liquid range (3,400° to 3,600° F) without impairing filleting or eroding the base metal; and
4. the remelt temperature is above the initial melting point since vanadium readily diffuses and alloys with tantalum.

The process of this invention is particularly suited to the fabrication of honeycomb structures. In the vacuum brazing process, brazing alloy flows into the nodes of the honeycomb core, providing columnar strengthening and stiffening. However, the honeycomb structure is only one of many structures which can be brazed in accordance with the present method. The application of the Cb-65V brazing alloy to tantalum alloys is not restricted by configuration except that the configuration must be suitable for brazing. That is, gap control, alloy reservoirs and other principles of brazing design must be adhered to. Sheet metal structures made from tantalum alloys can be vacuum brazed in accordance with the procedures described herein.

As will be evident to those skilled in the art, various modifications of this invention can be made or followed in view of the foregoing disclosure without departing from the spirit or scope of the invention.

We claim:

1. In a process for vacuum brazing tantalum alloy structural elements, the improvement which comprises the steps of:
   a. positioning braze foil of a columbium-vanadium alloy between surfaces of the elements to be joined:
   b. coating surfaces of the elements that are to be in contact wih a tungsten hearth plate and tungsten pellets with yttria powder;
   c. positioning the elements on the tungsten hearth plate disposed in a vacuum heating zone so that the yttria coated lowermost surface of the elements rests on the hearth plate;
   d. placing tungsten pellets on the yttria coated uppermost surface of the elements, thereby applying a downward pressure thereon and controlling the gap between the surfaces to be joined;
   e. heating the elements in the heating zone under a vacuum to a temperature sufficient to melt the foil; and
   f. after soaking at that temperature for from 3 to 8 minutes allowing the elements to cool gradually to room temperature.

2. The process according to claim 1 in which the alloy consists of 35 weight percent columbium and 65 weight percent vanadium.

3. The process according to claim 2 in which the structural elements to be joined comprise a honeycomb core and plate members disposed on its upper and lower surfaces with a braze foil having a thickness ranging from 0.003 to 0.005 inch interposed therebetween; the exposed surfaces of the plate members are coated with the yttria powder; and sufficient pellets are positioned on the plate member disposed on the upper surface of the honeycomb core to exert a downward pressure of at least 0.75 pounds per square inch.

4. The process according to claim 3 in which the structural elements are heated under a vacuum of about $10^{-5}$ torr to a temperature in the range of 3,400° to 3,600° F, the temperature being controlled so that the temperature difference across the plate members does not exceed 150° F.

5. The process according to claim 4 in which the heating zone is initially vacuum purged at room temperature for a period of at least 6 hours at a $10^{-5}$ torr vacuum; at the end of this period the temperature of the heating zone is increased to a temperature ranging from 2,000° to 2,200° F over a period of from 2.5 to 4.5 hours; after a thermal arrest of from about 0.5 to 1.0 hour at a temperature in the aforementioned range the temperature of the heating zone is increased to a temperature ranging from about 3,100° to 3,150° F in a period of about 10 to 20 minutes; after a thermal arrest of from about 10 to 20 minutes at a temperature in the last mentioned range the temperature of the heating zone is raised to a temperature ranging from 3,400° to 3,600° F in a period of from 6 to 12 minutes; and after soaking at a temperature in the last mentioned range the heating zone is allowed to cool to room temperature.

6. The process according to claim 5 in which the heating zone is cooled to about 2,900° F within 7 minutes; thereafter the heating zone is cooled to about 1,300° F in increments of 100° F every 5 minutes; and finally the heating zone is allowed to cool to room temperature.

7. An assembly for fabricating a structure from elements formed from a tantalum alloy comprising a tungsten hearth plate; a first structural element having a top surface adapted to coincide with a bottom surface of a second structural element, the bottom surface of the first element being coated with yttria powder and the first element being positioned on the hearth plate with its coated bottom surface in contact therewith; a layer of a columbiumvanadium alloy brazing foil covering the top surface of the first element, the bottom surface of the second element being positioned on the brazing foil; a coating of yttria powder covering the top surface of the second element; and tungsten pellets disposed on the coating of yttria powder covering the top surface of the second element.

8. An assembly for fabricating a honeycomb panel from a tantalum alloy comprising a tungsten hearth plate; a first tantalum alloy plate having one of its surfaces coated with yttria powder, the plate being positioned on the hearth plate with its coated surface in contact therewith; a first layer of a columbium-vanadium alloy brazing foil positioned on the uncoated surface of the first tantalum alloy plate; a flat tantalum alloy frame positioned on the brazing foil, the outer perimeter of the frame substantially coinciding with the perimeter of the first tantalum alloy plate; a second layer of the brazing foil covering the upper surface and inner edge of the frame; a tantalum alloy honeycomb core having an upper and a lower face and a perimeter greater than the inner and smaller than the outer perimeter of the flat frame, the core being positioned with its lower face in contact with the first layer of brazing foil and the lower face having a recess formed therein around its outer edge in which a portion of the flat frame and the second layer of brazing foil is disposed; a third layer of the brazing foil covering the upper face of the honeycomb core; a second tantalum alloy plate positioned on the third layer of the brazing foil; a fourth layer of the brazing foil outlining the outer edge of the upper surface of the second plate and extending downwardly around the sides of the honeycomb core so as to meet the second layer of brazing foil; a second tantalum alloy frame having a first horizontal member positioned on the portion of the fourth layer of brazing foil outlining the outer edge of the upper surface of the second plate, a vertical leg positioned against the portion of fourth layer of brazing foil extending downwardly around the sides of the honeycomb core, and a second horizontal member positioned on the second layer of the brazing foil with its outer edge substantially coinciding with the outer edge of the flat frame; a coating of yttria powder covering the outer surfaces of the second plate and the second frame; and tungsten pellets disposed on the coating of yttria powder covering the outer surfaces of the second plate and the second frame.

* * * * *